(12) United States Patent
Balannik et al.

(10) Patent No.: US 9,292,829 B2
(45) Date of Patent: Mar. 22, 2016

(54) SYSTEM AND METHOD FOR UPDATING STATUS INFORMATION

(75) Inventors: Vadim Balannik, Arlington Heights, IL (US); Patrick Dell Ellis, Lake In The Hills, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 152 days.

(21) Appl. No.: 13/418,153

(22) Filed: Mar. 12, 2012

(65) Prior Publication Data

US 2013/0238723 A1 Sep. 12, 2013

(51) Int. Cl.
G06Q 10/10 (2012.01)
H04W 4/12 (2009.01)

(52) U.S. Cl.
CPC *G06Q 10/10* (2013.01); *H04W 4/12* (2013.01)

(58) Field of Classification Search
CPC .... G06Q 10/107; G06Q 10/10; H04L 12/585; H04L 12/58; H04L 29/08072; H04W 4/12
USPC .................................................. 709/206, 204
See application file for complete search history.

(56) References Cited

U.S. PATENT DOCUMENTS

| | | | |
|---|---|---|---|
| 8,533,306 B2 * | 9/2013 | Nguyen et al. | 709/222 |
| 2004/0064567 A1 * | 4/2004 | Doss et al. | 709/228 |
| 2005/0186977 A1 * | 8/2005 | Chiu et al. | 455/466 |
| 2006/0233132 A1 * | 10/2006 | Lee | 370/328 |
| 2008/0030316 A1 * | 2/2008 | Flick | 340/466 |
| 2008/0256192 A1 * | 10/2008 | Pinard et al. | 709/206 |
| 2009/0150373 A1 | 6/2009 | Davis et al. | |
| 2010/0088140 A1 * | 4/2010 | Gil et al. | 705/8 |
| 2010/0205270 A1 * | 8/2010 | Bells et al. | 709/206 |
| 2010/0299615 A1 * | 11/2010 | Miluzzo et al. | 715/752 |
| 2011/0010218 A1 * | 1/2011 | Gupta | 705/9 |
| 2011/0238755 A1 * | 9/2011 | Khan et al. | 709/204 |
| 2013/0238723 A1 * | 9/2013 | Balannik et al. | 709/206 |
| 2014/0357307 A1 * | 12/2014 | Zwaal | 455/457 |

OTHER PUBLICATIONS

Extended European search report mailed Sep. 12, 2012, in corresponding European patent application No. 12159056.6.
The International Search Report and Written Opinion mailed Sep. 20, 2012, in corresponding PCT patent application No. PCT/US2012/030420.
International Preliminary Report on Patentability mailed Sep. 16, 2014; in PCT patent application No. PCT/US2012/030420.

* cited by examiner

*Primary Examiner* — Michael C Lai
(74) *Attorney, Agent, or Firm* — Thomas Grzesik; Fleit Gibbons Gutman Bongini & Bianco P.L.

(57) ABSTRACT

To avoid the need to access multiple applications and perform multiple corresponding status changes each time a user or device's status or availability changes, multiple status updates can be generated and provided to corresponding systems, according to a detected event. To enable status updates to be provided to multiple systems based on the detected event, a status update module can be used, which is operable to send multiple status updates to multiple systems on behalf of a mobile device. By using a status server or other network-based component to performing such updating, processing can be offloaded from the mobile devices and updates can be performed even when the mobile devices are not communicable with the systems being updated.

25 Claims, 17 Drawing Sheets

SYSTEM AND METHOD FOR UPDATING STATUS INFORMATION

TECHNICAL FIELD

The following relates to systems and methods for updating status information.

DESCRIPTION OF THE RELATED ART

Many mobile electronic devices, such as smart phones, provide multiple ways for users to communicate with others. For example, a mobile device may provide the ability to exchange emails, participate in instant messaging (IM) conversations, communicate via social networks, participate in telephone calls, participate in networked gaming, etc.

As the number of media by which the user can be communicated with increases, the amount of effort involved in notifying others of the availability of the user also increases. For example, if a user is busy or unavailable and wishes to convey this information to contacts that may be communicating with them, the user may be required to change IM presence, turn on out-of-office replies, change social networking statuses, etc. Moreover, when the user again becomes available, the user would need to change each status to reflect a change in availability.

BRIEF DESCRIPTION OF THE DRAWINGS

Embodiments will now be described by way of example only with reference to the appended drawings wherein.

DETAILED DESCRIPTION

Figure 1:
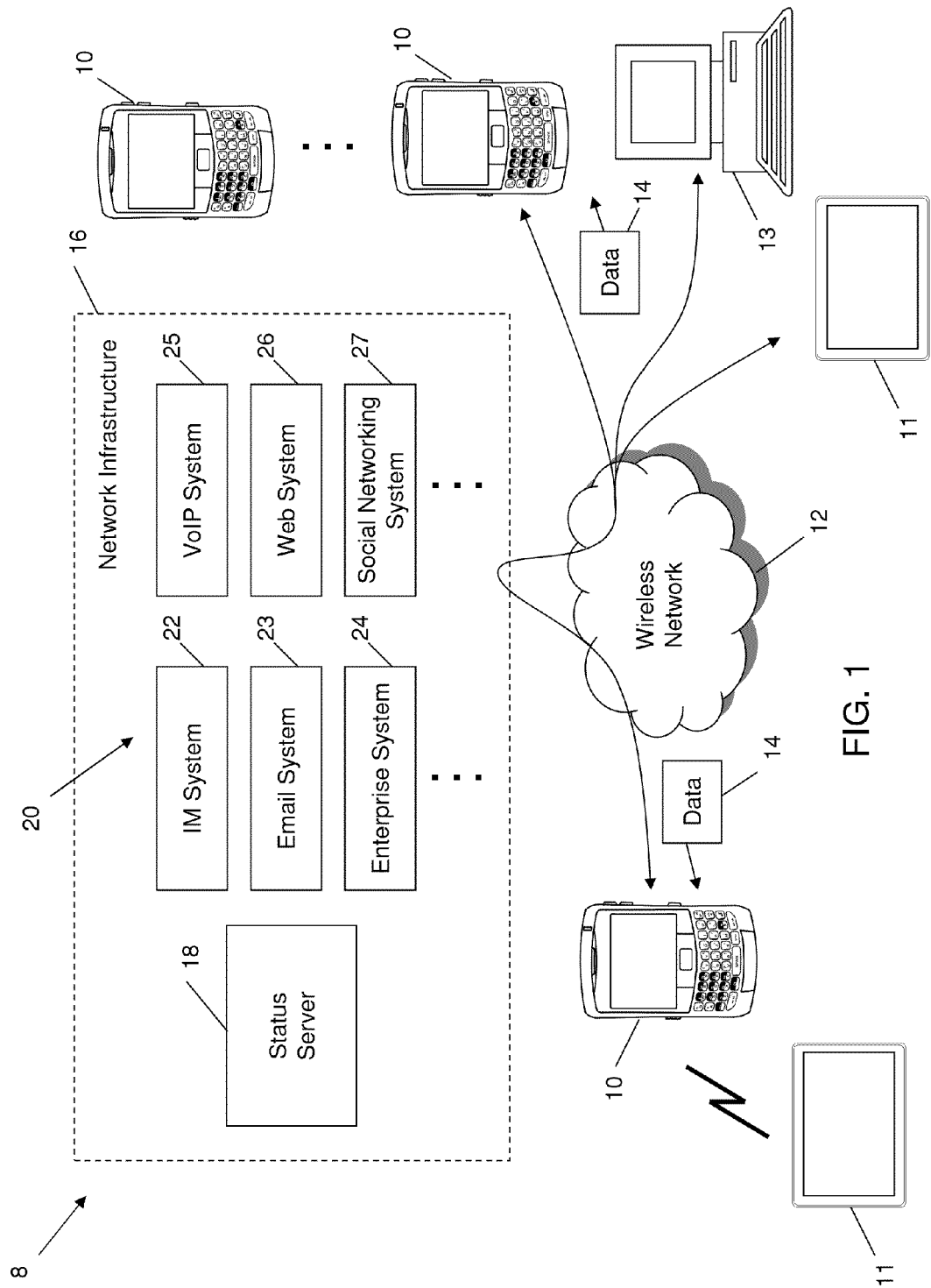
FIG. 1 is a block diagram of an example of a communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practised without these specific details. In other instances, well-known methods, procedures and components have not been described in detail so as not to obscure the examples described herein. Also, the description is not to be considered as limiting the scope of the examples described herein.

It has been found that to avoid the need to access multiple applications and perform multiple corresponding status changes each time a user or device's status or availability changes, multiple status updates can be generated and provided to corresponding systems, according to a detected event. To enable status updates to be provided to multiple systems based on the detected event, a status update module can be used, which is operable to send multiple status updates to multiple systems on behalf of a mobile device. By using a status server or other network-based component to performing such updating, processing can be offloaded from the mobile devices and updates can be performed even when the mobile devices are not communicable with the systems being updated.

Turning now to FIG. 1, an example of a communication system 8 is shown. The communication system 8 enables mobile devices 10 to communicate with each other, in this example, via a wireless network 12. As also shown in FIG. 1, mobile devices 10 may also be communicable with other electronic devices, such as personal computers 13, tablet computers 11, etc. Similarly, the mobile devices 10 may be communicable with other electronic devices over short-range connections, e.g., Bluetooth, Wi-Fi, etc. For example, as shown in FIG. 1, a smart phone type mobile device 10 may communicate with a tethered, coupled or otherwise short-range-communicable tablet computer 11. Data 14 may be exchanged between a mobile device 10 and any other one or more mobile devices 10 or other electronic devices connectable to or otherwise available through the wireless network 12 or other short range or wired networks. The data 14 may include, without limitation, messages, voice signals, data files, audio signals, etc. and the examples shown in FIG. 1 are illustrative only.

The communication system 8 in this example includes a network infrastructure 16 which may be part of the wireless network 12 or another network or system communicable with the wireless network 12. In this example, the network infrastructure 16 supports, includes, or otherwise enables data 14 to be exchanged between electronic devices 10, 11, 13, or obtained for such electronic devices 10, 11, 13 (e.g., uploaded to or downloaded from) using various systems 20, which may have underlying protocols or services made accessible to the mobile devices 10 via the wireless network 12. For example, as shown in FIG. 1, the network infrastructure 16 may include or otherwise support various systems and corresponding services such as an instant messaging (IM) system 22, an email system 23, an enterprise system 24, a voice-over-internet protocol (VoIP) system 25, a web system 26 (e.g., a web page or service), and a social networking system 27.

In the example shown in FIG. 1, the network infrastructure 16 also includes a status server 18. As discussed below, the status server 18 may be used to enable a mobile device 10 to provide status updates 32 (shown as "status" for brevity—see also FIGS. 2-7) to a plurality of systems 20 in response to an event or event message 30 (shown and referred to collectively as "event" for brevity). Providing multiple status updates 32 in this way avoids the need to update each system 20 individually when the event 30 is detected. It can be appreciated that reference numeral 30 may be associated interchangeably with an event or event message since an actual event may be detected and used or a message indicative of an event may also be provided to, for example, the status server 18 or the mobile device 10. Although the following examples may illustrate the provision of status updates 32 in connection with a mobile device 10, the principles equally apply to other electronic devices, such as those illustrated in FIG. 1.

Figure 2:
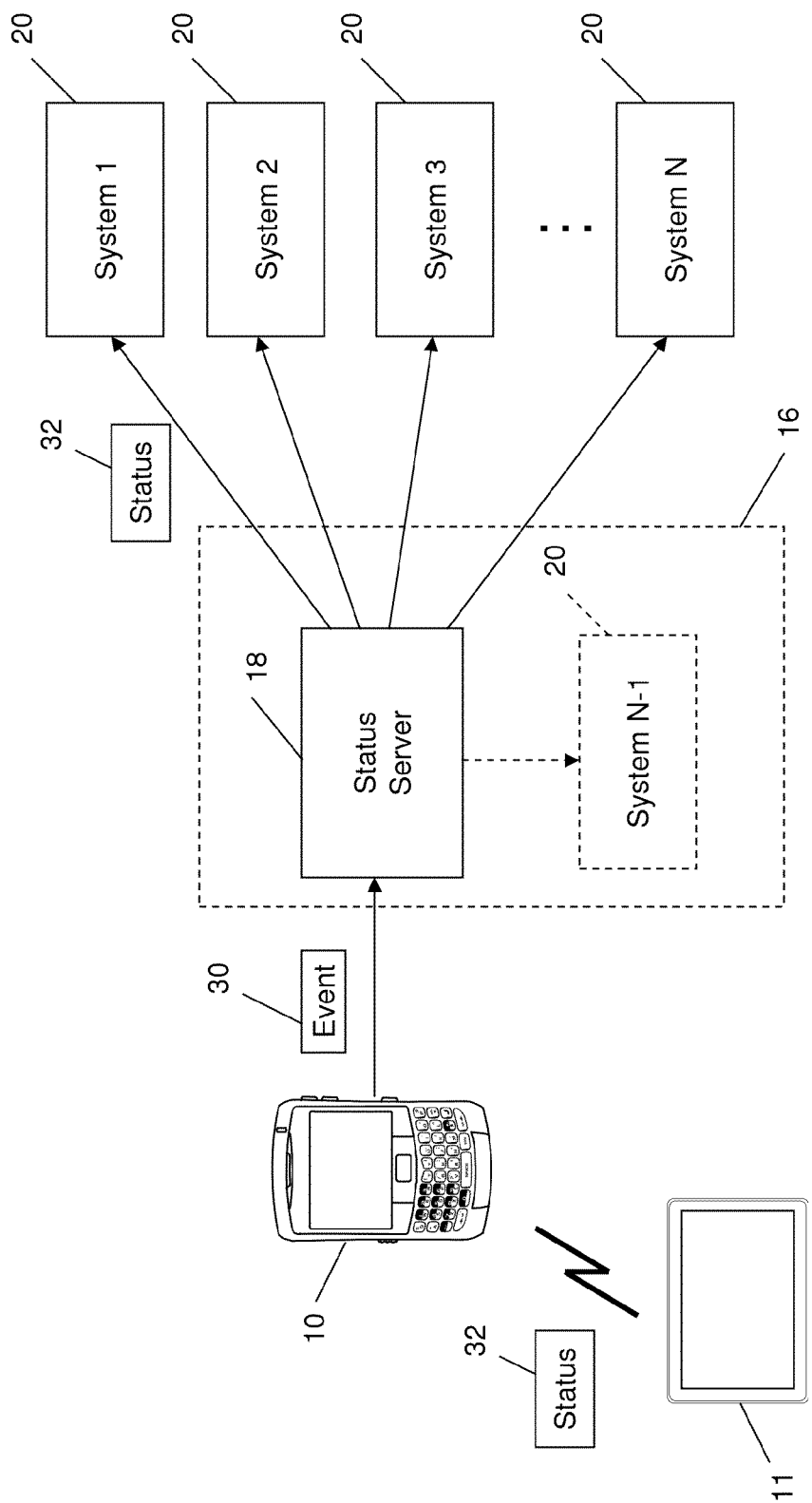
FIG. 2 is a block diagram illustrating an example use of a status server to update status information to a plurality of systems.

FIG. 2 illustrates an example configuration in which the status server 18 is notified of an event 30 by the mobile device 10 and generates, according to the event 30, a status update 32 that may be provided to multiple systems 20 at the same time. This configuration allows status updates 32 to be centrally managed by the mobile device 10 to allow a user to centrally change system statuses or system statuses to be automatically updated after detecting the event 30. It can be appreciated that the status server 18 may be a component or entity within a wider system, e.g., part of the network infrastructure 16 (as shown in dashed lines in FIG. 2) and thus may internally update one or more systems 20. For example, the status server 18 may be included in network infrastructure component that also supports or otherwise hosts an IM system 22. As shown in FIG. 2, it can be appreciated that the mobile device 10 may also be operable to send status updates 32 to other electronic devices over short-range connections, e.g., via a local Wi-Fi network or a tethered Bluetooth connection to a tablet computer 11 as shown by way of example in FIG. 2.

Figure 3:
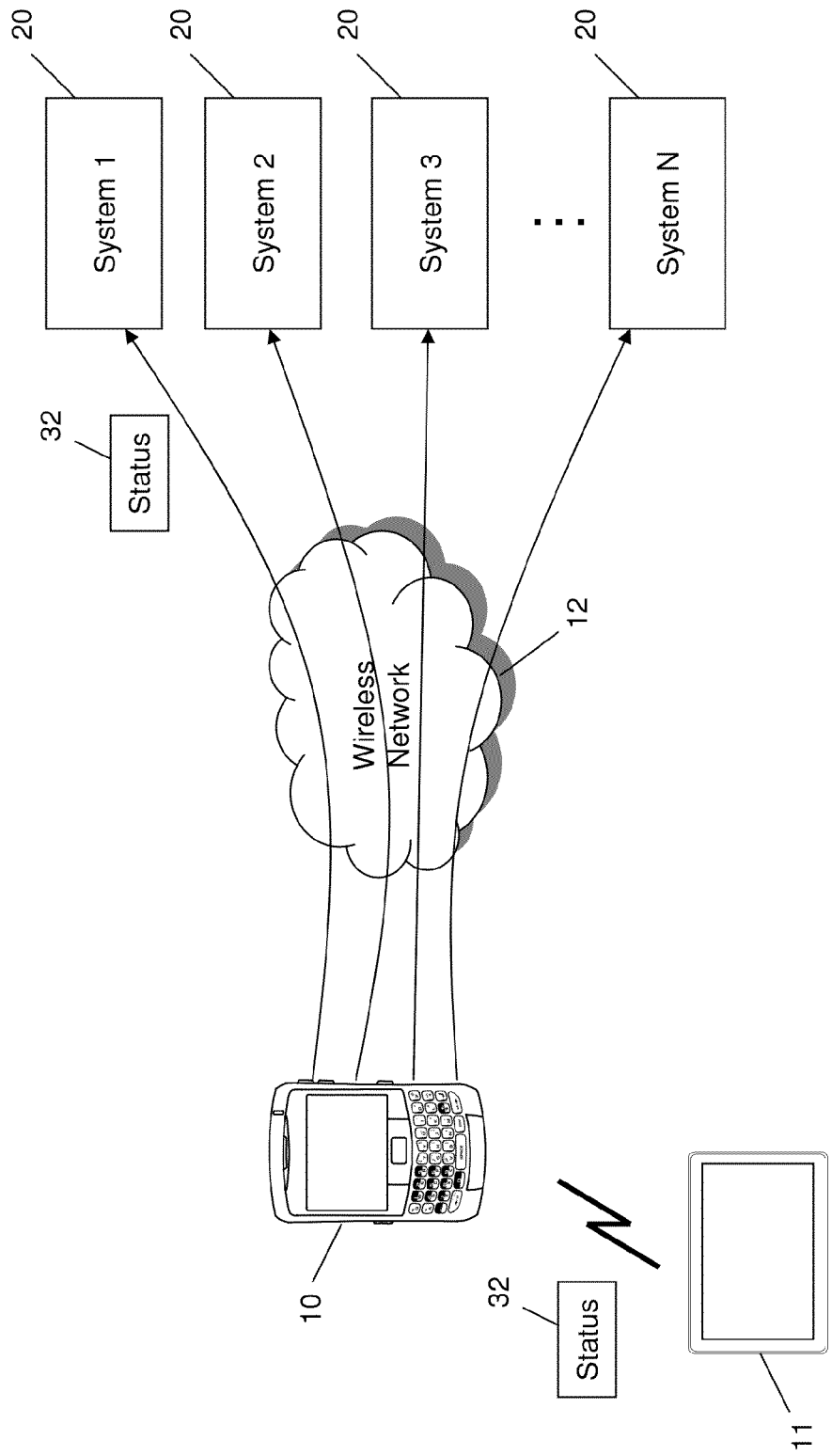
FIG. 3 is a block diagram illustrating an example of a mobile device updating status information to a plurality of systems.

FIG. 3 illustrates another example configuration in which the mobile device 10 provides multiple status updates 32 directly to multiple systems 20. The configuration shown in FIG. 3 may be utilized in communication systems 8 wherein the mobile device 10 is capable of communicating with the systems 20 directly (e.g., does not require an intermediary server), wherein access to the status server 18 is temporarily (or permanently) unavailable to the mobile device 10, wherein the responsibilities of the status server 18 reside on the mobile device 10, wherein the mobile device 10 is operable to communicate with both the status server 18 and at least one of the systems 20 directly, etc. As shown in FIG. 3, it can be appreciated that the mobile device 10 may also be operable to send status updates 32 to other electronic devices over short-range connections, e.g., via a local Wi-Fi network or a tethered Bluetooth connection to a tablet computer 11 as shown by way of example in FIG. 3.

Figure 4:
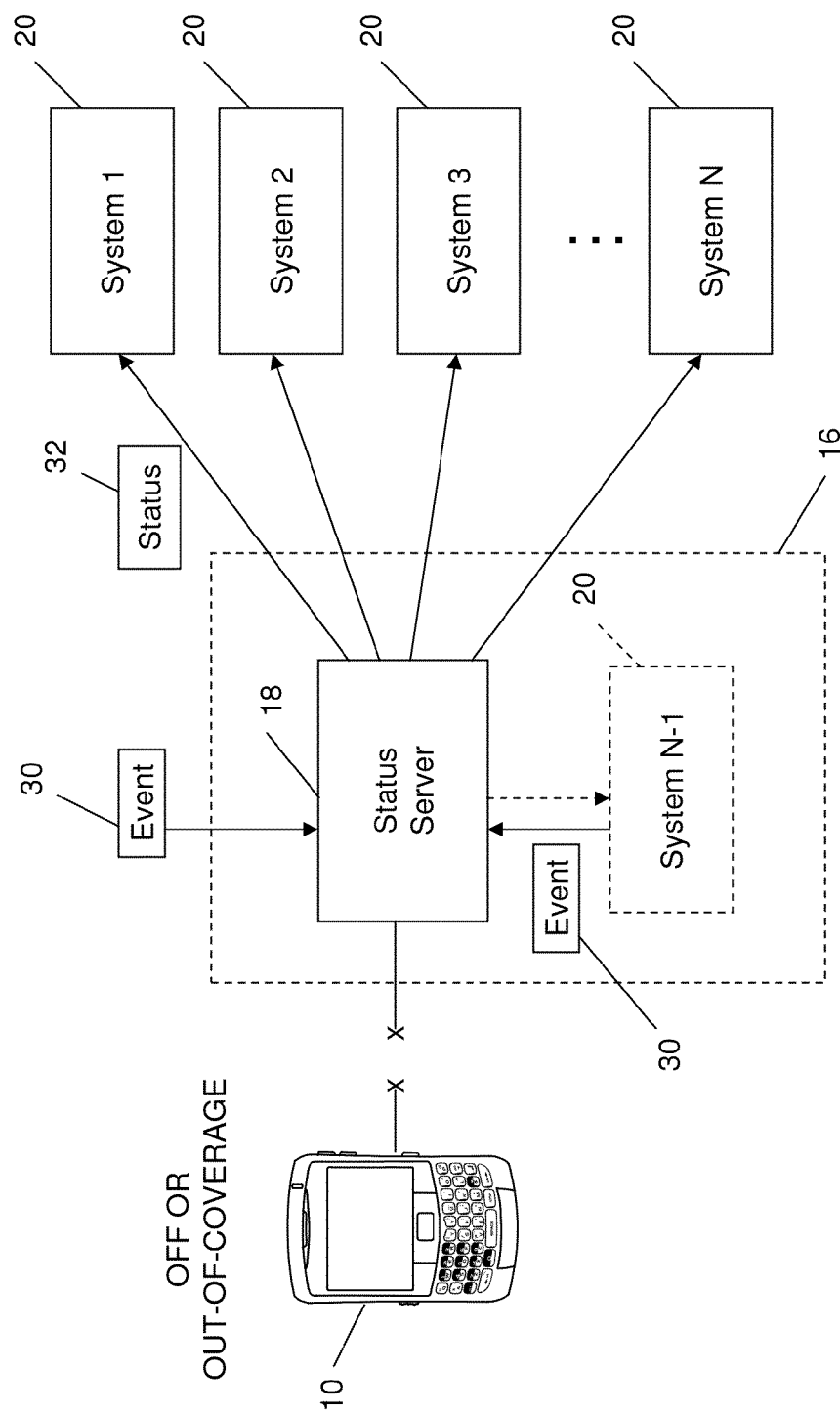
FIG. 4 is a block diagram illustrating an example use of a status server to update status information to a plurality of systems.

It can be appreciated that utilizing the status server 18 enables the systems 20 to be updated using the status updates 32 even when the mobile device 10 is offline or out-of-coverage, for example, as shown in FIG. 4. In FIG. 4 it can be seen that in addition to detecting the off or out-of-coverage status as an event 30, the status server 18, in being within the network infrastructure 16 can detect other events 30, including those provided to the status server 18 from outside of the network infrastructure 16 and those provided within the network infrastructure 16. For example, as shown in FIG. 4, System N-1 20 may be operable to notify the status server 18 of calendar appointments, geographical location information (e.g., time zone, GPS location, etc.), social networking updates (e.g., wherein a user changes a status using a PC or other device), etc.

By providing the status server 18, status updates 32 may be provided to the systems 20 even when the mobile device 10 is not currently communicable with those systems 20. Moreover, the status server 18, operable in this manner, can pre-emptively adjust a user's status for multiple systems 20 and revert to a previous status or change the status at the end of an event's duration thus offloading processing requirements of the mobile device 10. In communication systems 8 where the mobile device 10 already utilizes a network infrastructure 16 for communicating with other mobile devices 10, providing the status server 18 (or equivalent functionality) within or in conjunction with a component in such a network infrastructure 16 can update systems 20 with status information without adding considerable overhead to the communication system 8.

Figure 5:
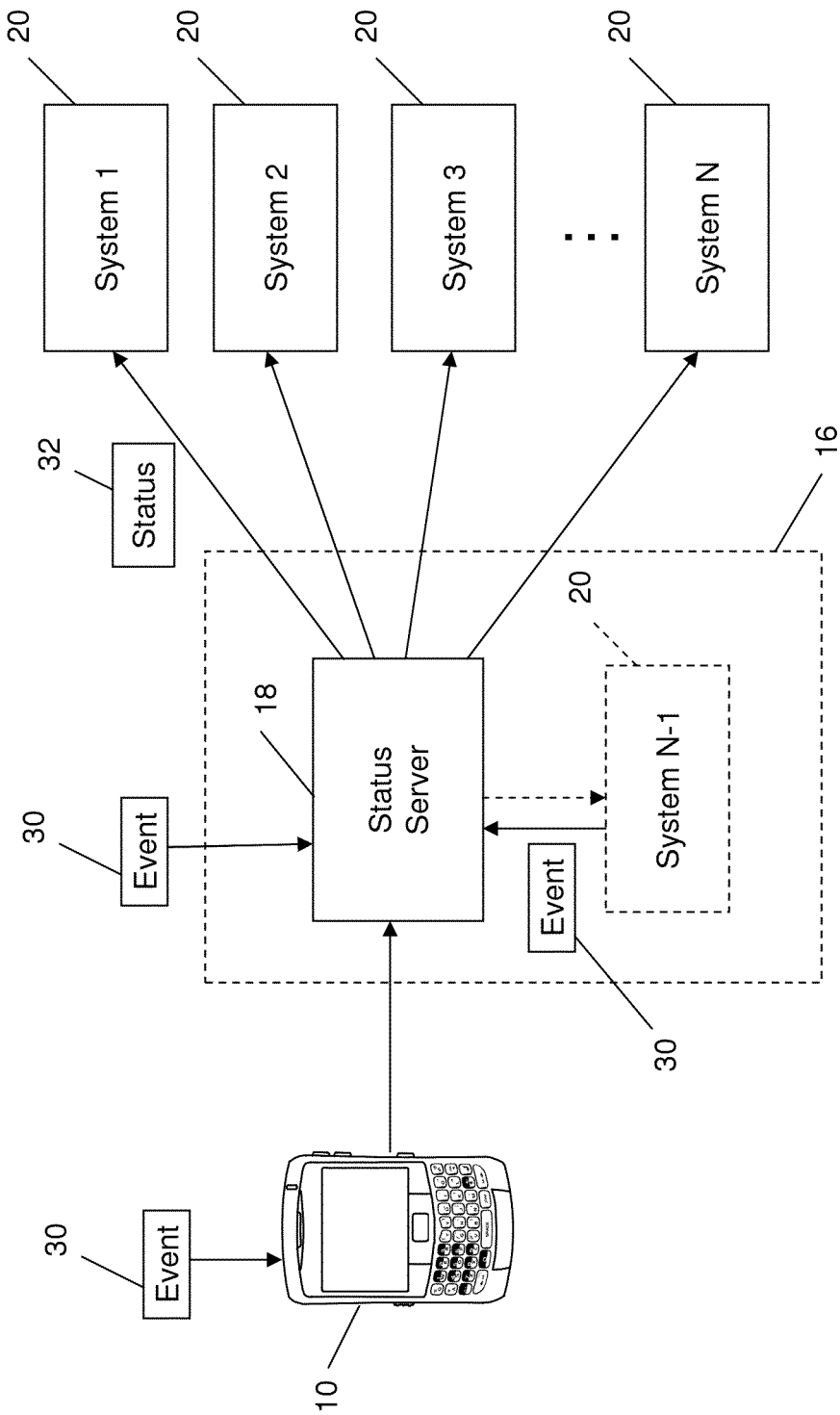
FIG. 5 is a block diagram illustrating an example use of a status server to update status information to a plurality of systems.

FIG. 5 illustrates a scenario in which the mobile device 10 is back-in-coverage, turned on, or otherwise normally communicable with the status server 18. It can be appreciated from FIG. 5 that the status server 18 may be operable to receive information concerning events 30 detected on or by the mobile device 10 in addition to events 30 detected by or provided to the status server 18. The status server 18 may also be operable to process redundant or conflicting events 30 provided thereto. For example, the status server 18 may receive a first event 30 from the mobile device 10 indicative of the user wishing to be shown as "unavailable". The status server 18 may also receive or detect a calendar appointment event 30 with an associated status of "in a meeting". The status server 18 may use a user profile, set of rules, or other criteria to resolve the different statuses to generate a single status update 32. For example, each status may be associated with a level and the highest or lowest level given priority in determining which status to be selected. In another example, any event 30 provided by the mobile device 10 directly may be given the highest priority to thereby override any other events 30 detected by the status server 18. It can be appreciated that the status server 18 and mobile device 10 may instead be operable to have events 30 provided only by the mobile device 10 or have events 30 only detectable by the status server 18 to minimize or eliminate redundant or conflicting status instructions.

Figure 6:
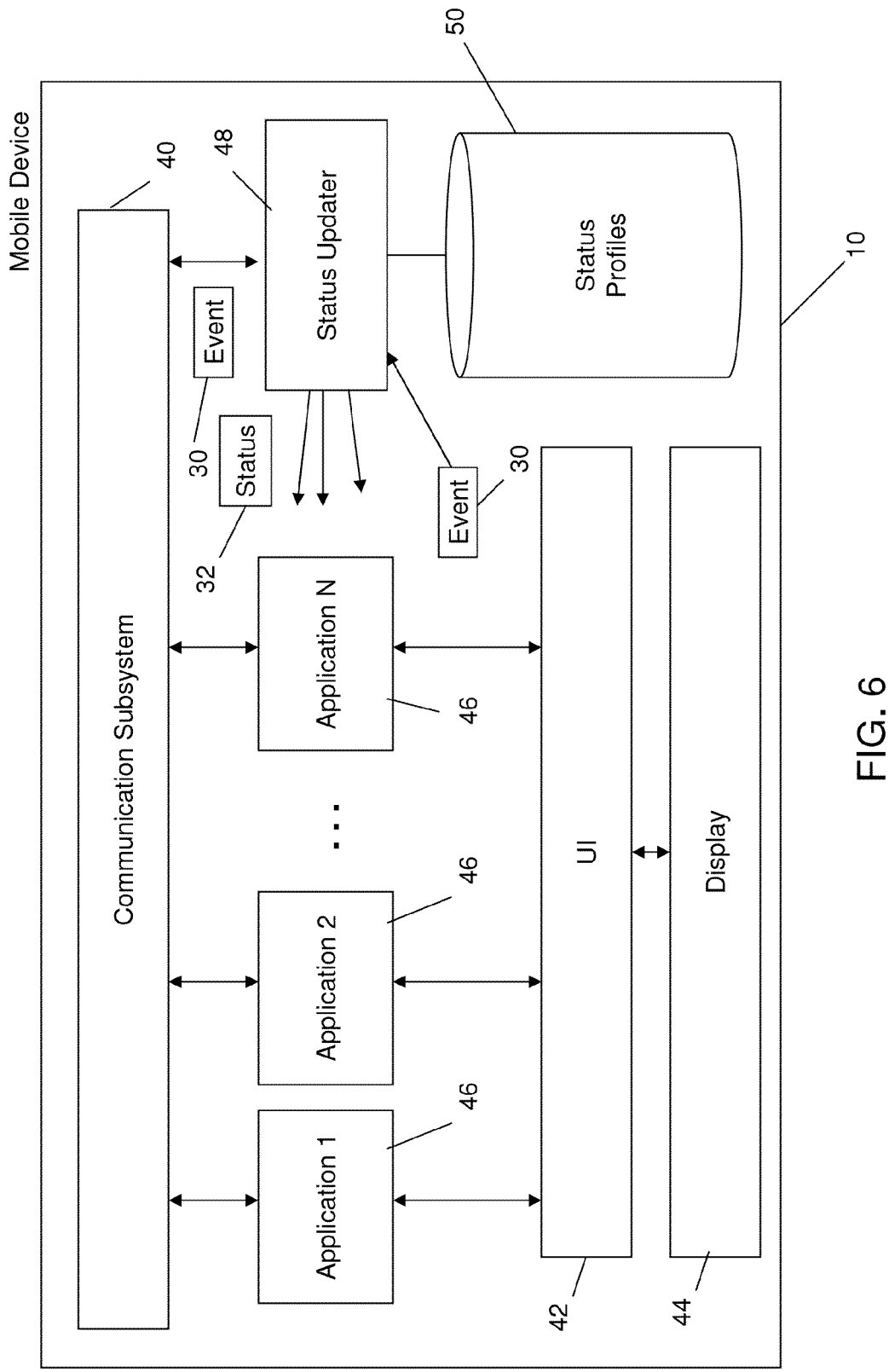
FIG. 6 is a block diagram illustrating an example of a block diagram for a mobile device.

FIG. 6 illustrates an example configuration for a mobile device 10 that is operable to determine or detect events 20 and provide status updates 32 to the status server 18 or directly to multiple systems 20. The mobile device 10 shown in FIG. 6 comprises a communication subsystem 40 to enable the mobile device 10 to connect to, and communicate using access to, the wireless network 12. The mobile device 10 also includes a user interface (UI) 42 and a display 44 for rendering UI elements for various applications 46 on a display of the mobile device 10. The mobile device 10 in this example includes a status updater 48, which is communicable with at least one of the applications 46 for locally updating statuses for the respective applications 46 and to provide status updates 32 to the status server 18 over the wireless network 12 using the communication subsystem 40. The status updater 48 is also operable to detect events 30 on the mobile device 10 or be provided with events 30 or other information indicative of events 30 from external sources. For example, the mobile device 10 may detect a short range Bluetooth pairing with a vehicle indicative of reduced availability, may detect a new GPS location associated with the mobile device 10, etc. It can be appreciated that in either of these examples, the mobile device 10 may rely on an internal component for detecting the event 30 or may rely on data obtained by the mobile device 10 from the external source. The status updater 48 may include or have access to status profiles 50 for determining event-to-status mappings for the various applications 46 being updated.

It can be appreciated that the configuration shown in FIG. 6 may also be employed by mobile devices 10 that are not responsible for updating the systems 20 or triggering the status server 18 to update the systems 20. In such examples, the status updater 48 may be used to locally update applications 46 when status updates 32 independent of and at the same time as being provided to the systems 20 by the status server 18.

Figure 7:
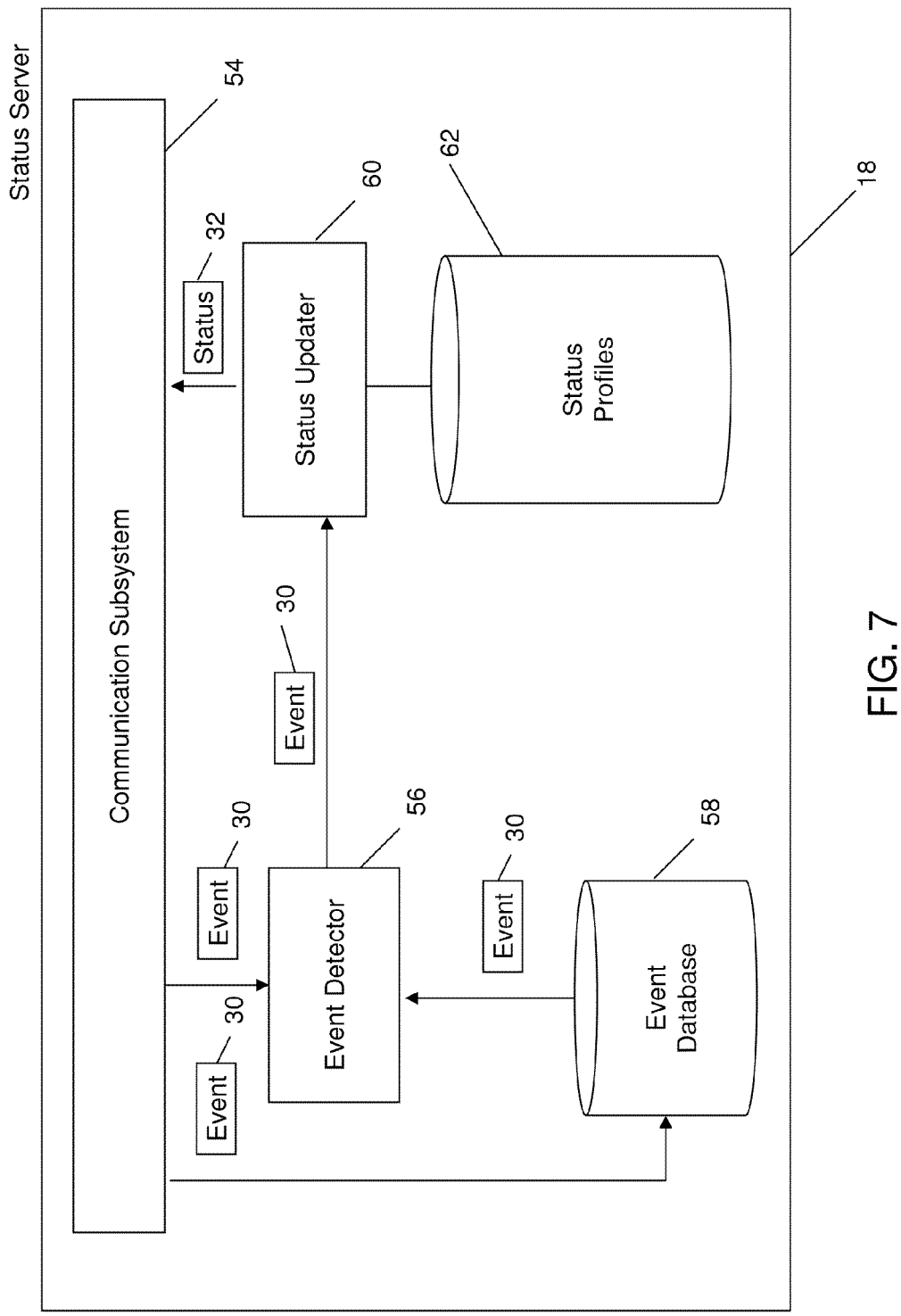
FIG. 7 is a block diagram illustrating an example of a block diagram for a status server.

FIG. 7 illustrates an example configuration for the status server 18. In the example shown in FIG. 7, the status server 18 includes a communication subsystem 54 for connecting to the network infrastructure 16, the wireless network 12, or any other applicable component or entity of the communication system 8. The status server 18 includes an event detector 56 and an event database 58. It can be appreciated that the event database 58 is shown for illustrative purposes only and may represent any storage device or multiple storage devices either residing on the status server 18, or otherwise connectable to or communicable therewith. For example, the event detector 56 may have a local event database 58 as shown for storing events 30 provided to the status server 18, may access other databases associated with the systems 20 (e.g., calendar event databases, GPS location databases, etc.). The event detector 56 enables the status server 18 to detect events 30 provided to the status server 18 through the communication subsystem 58, events 30 stored directly to the event database 58, events 30 provided by external databases, etc.

The events 30 or information indicative of the events 30 may be provided to a status updater 60. The status updater 60 is shown as a separate component from the event detector 56 for illustrative purposes only. The status updater 60 in this example uses events 30 or information indicative of the events 30 to determine an associated status for each of a plurality of systems 20. For example, GPS related event 30 may generate an out-of-office message for an email system 20 while showing an available status to friends in a social group. The status updater 60 may use status profiles 62 stored on or accessible to the status server 18 to determine event-to-status mappings for particular users associated with particular mobile devices 10. The status updater 60 is configured in this example to provide status updates 32 to the plurality of systems 20 using the communication subsystem 54. As such, it can be appreciated that the communication subsystem 54 shown in FIG. 7 is representative of any communication module, device, protocol, or service that the status server 18 may utilize to communicate with a system 20, the wireless network 12, mobile devices 10, etc.

Figure 8:
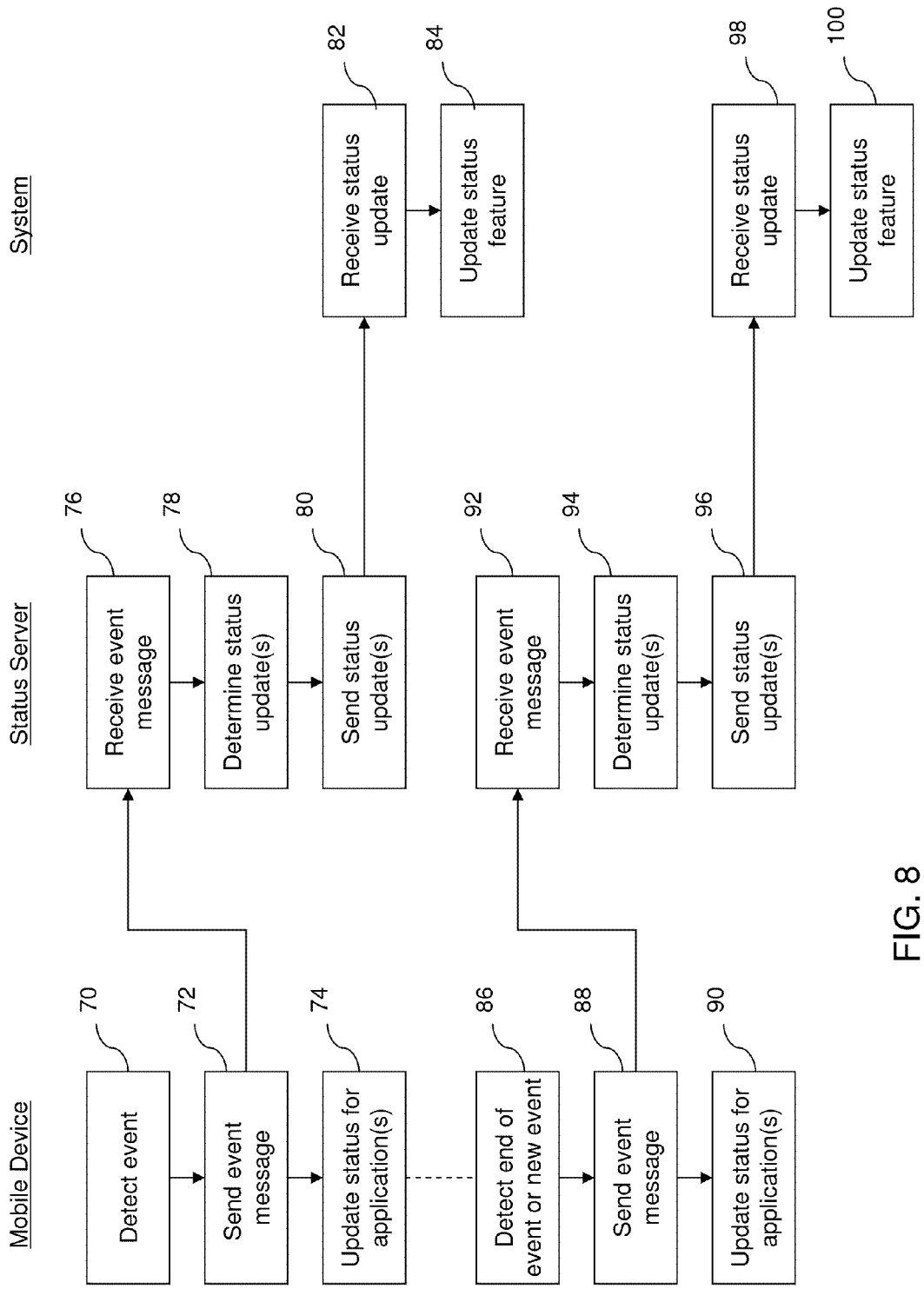
FIG. 8 illustrates example computer executable operations that may be performed in updating status information to a plurality of systems.

Turning now to FIG. 8, an example set of operations is shown that may be executed in utilizing a status server 18 to provide status updates 32 to a plurality of systems 20. It can be appreciated that only one system 20 being updated is shown in FIG. 8 for ease of illustration and similar operations may be performed at each system 20 being updated.

In the example shown in FIG. 8, the mobile device 10 detects an event 30, at 70, and sends an event message 30, at 72. The mobile device 10 may also locally update the status for one or more applications, at 74. The status server 18 receives the event message 30, at 76, and determines the associated status updates 32, at 78. It can be appreciated that the event-to-status mappings may be determined by referencing an event database 58 as shown in FIG. 7, by querying or requesting such information from an external database, or by referencing information included in the event message 30. For example, the mobile device 10 may associate a status for each application on an event-by-event basis and include a mapping or other indication of the status update 32 to be provided to each system 20 being updated. The status server 18 may then send the status updates 32 to the appropriate systems 20, at 80, which are received by the respective systems 20, at 82. Each system 20 may then update its own status feature (e.g., presence, out-of-office, etc.), at 84. It can be appreciated that the system 20 may also send updates to other mobile devices 10 indicative of the status update 32 according to the nature of the service or status feature being utilized.

FIG. 8 also illustrates an example wherein the event 30 detected, at 70, has a duration of time, expiration, or other "end" criterion (e.g., a superseding new event) associated therewith. In this example, the end of the event 30 or a new event 30 is detected by the mobile device 10, at 86. The mobile device 10 may also locally update the status for the one or more applications, at 90, e.g., to revert to statuses used prior to detecting the first event 30, at 70. A second event message 30 is sent, at 88, to the status server 18, which is received by the status server 18, at 92. The status server 18 determines the associated status updates 32, at 94, e.g., as done above, and sends status updates 32 to the systems 20, at 96. The status updates 32 are received by the respective systems 20, at 98, and each system 20 may then update its own status feature (e.g., presence, out-of-office, etc.), at 100.

Figure 9:
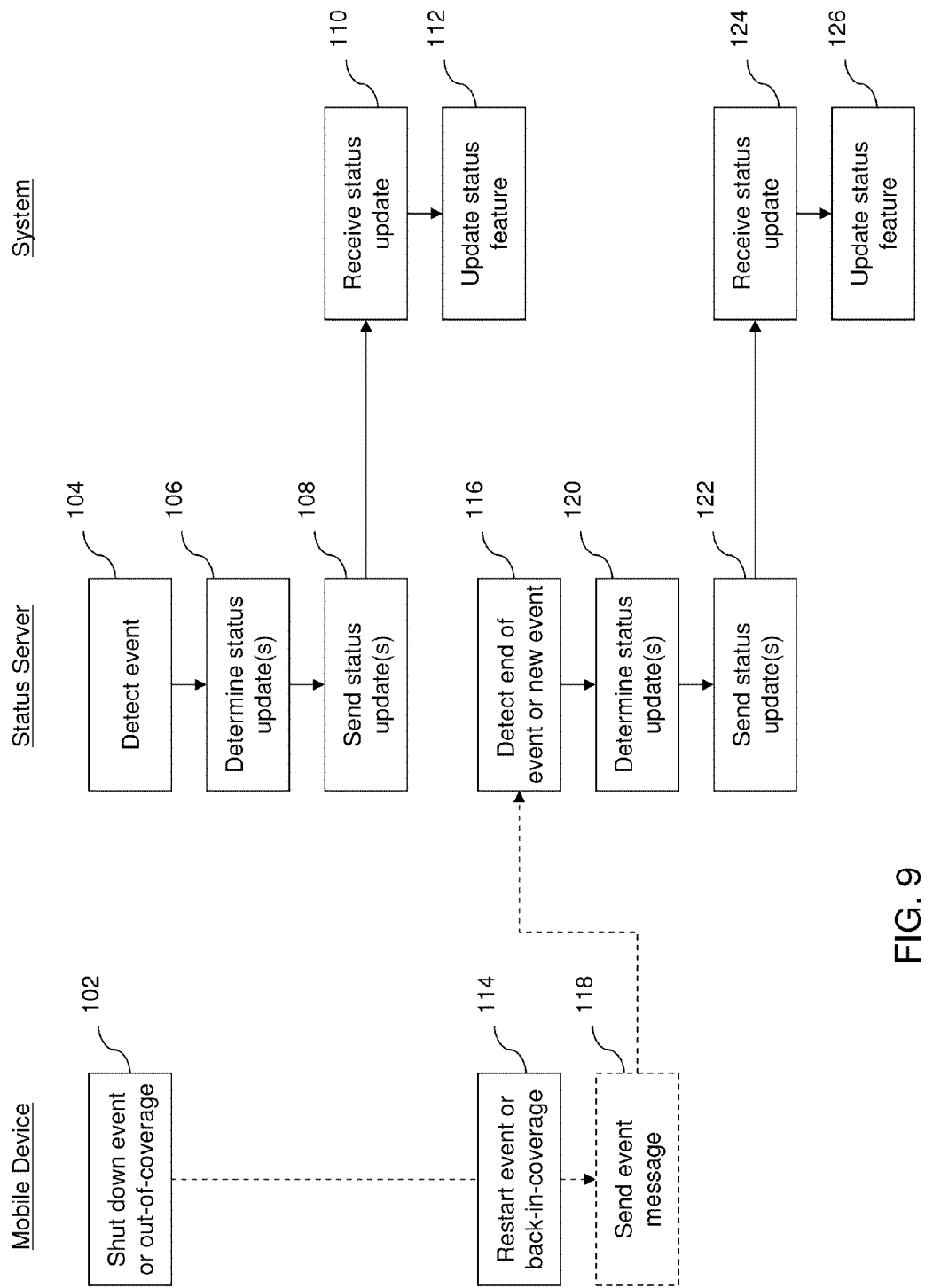
FIG. 9 illustrates example computer executable operations that may be performed in updating status information to a plurality of systems.

FIG. 9 illustrates an example wherein an event 30 associated with a shutdown, power-off, or out-of-coverage associated with the mobile device 10 is detected by the status server 18. A shut down or out-of-coverage related event 30, at 102, and the status server 18 is operable to detect shut down or out-of-coverage event 30, at 104. For example, the status server 18 may be incorporated into the network infrastructure 16 or be communicable with an entity or component of a network infrastructure 16 that is capable of detecting or tracking the mobile device's connectivity. The status server 18 determines the associated status updates 32, at 106. It can be appreciated that, similar to the example shown in FIG. 8, the event-to-status mappings may be determined by referencing an event database 58 as shown in FIG. 7, by querying or requesting such information from an external database, or by referencing information included in the event message 30. The status server 18 may then send the status updates 32 to the appropriate systems 20, at 108, which are received by the respective systems 20, at 110. Each system 20 may then update its own status feature (e.g., presence, out-of-office, etc.), at 112. It can be appreciated that the system 20 may also send updates to other mobile devices 10 indicative of the status update 32 according to the nature of the service or status feature being utilized.

In the example shown in FIG. 9, a new event 30 corresponding to a device restart or the mobile device 10 being back-in-coverage occurs, at 114. As illustrated in FIG. 9, the mobile device 10 may send an event message 30, at 118, indicative of the device restart or back-in-coverage status, the status server 18 may detect the end of the event or new event 30 associated with the device restart or back-in-coverage status, at 116, or both. The mobile device 10 may also locally update the status for the one or more applications (not shown in FIG. 9), e.g., to revert to statuses used prior to the device shutdown or back-in-coverage event 30. The status server 18 determines the associated status updates 32, at 120, and sends status updates 32 to the systems 20, at 122. The status updates 32 are received by the respective systems 20, at 124, and each system 20 may then update its own status feature (e.g., presence, out-of-office, etc.), at 126.

It can be appreciated that by enabling the status server 18 to detect events 30 as illustrated in FIG. 9, status updates 32 can be provided to the systems 20 even when the mobile device 10 would not be capable of updating the systems 20 or the status server 18 at that time.

Figure 10:
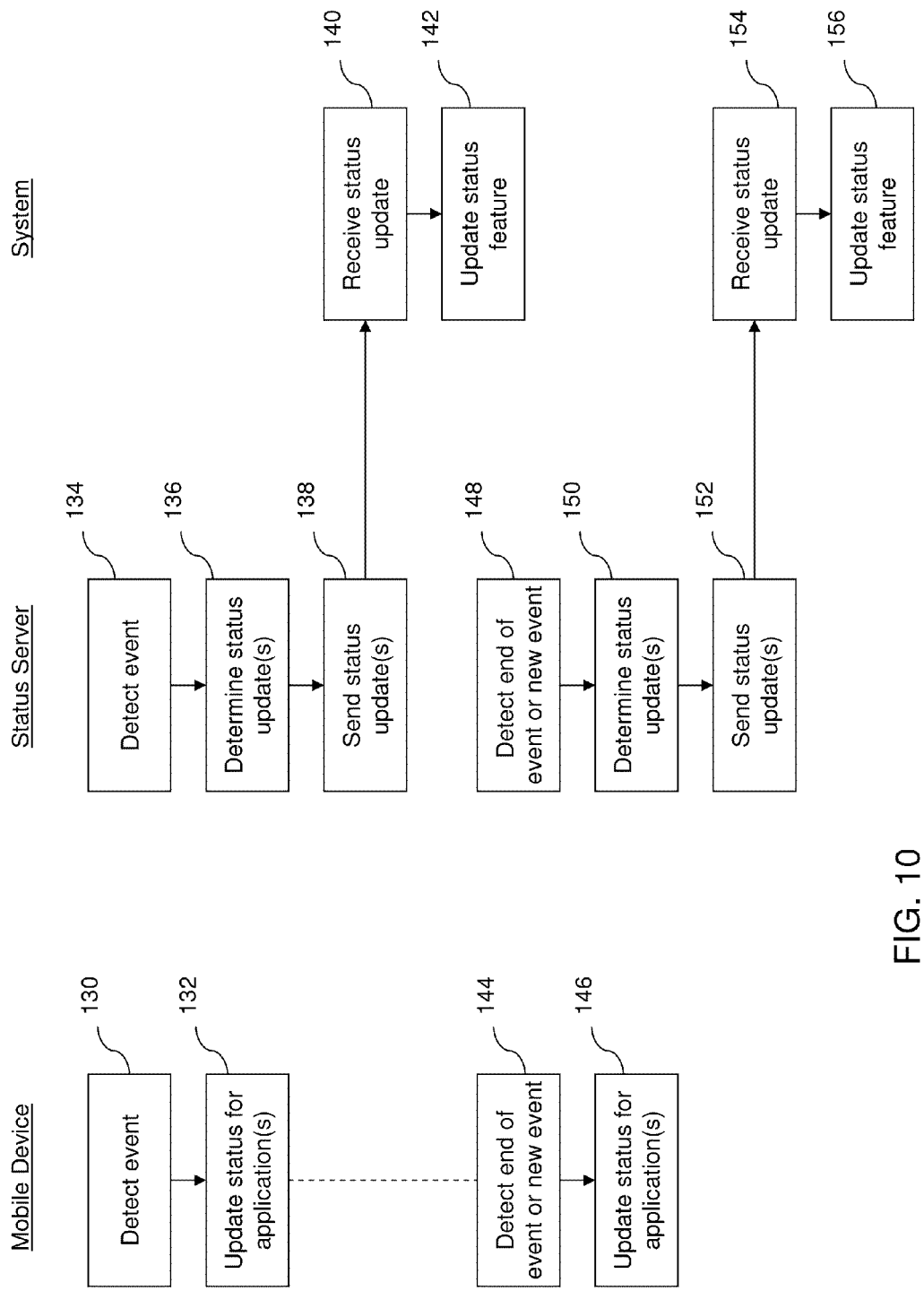
FIG. 10 illustrates example computer executable operations that may be performed in updating status information to a plurality of systems.

FIG. 10 illustrates an example wherein the mobile device 10 and status server 18 are operable to independently detect an event 30, e.g., a calendar event 30, change of location, etc. In the example shown in FIG. 10, an event 30 is detected by the mobile device 10, at 130, and the mobile device 10 locally updates the status for the one or more applications, at 132. The status server 18 is also operable to detect the same event 30, at 134, and determines the associated status updates 32, at 136. It can be appreciated that, similar to the examples described above, the event-to-status mappings may be determined by referencing an event database 58 as shown in FIG. 7, by querying or requesting such information from an external database, or by referencing information included in the event message 30. The status server 18 may then send the status updates 32 to the appropriate systems 20, at 138, which are received by the respective systems 20, at 140. Each system 20 may then update its own status feature (e.g., presence, out-of-office, etc.), at 142. It can be appreciated that the system 20 may also send updates to other mobile devices 10 indicative of the status update 32 according to the nature of the service or status feature being utilized.

In the example shown in FIG. 10, an "end" associated with the event detected at 130 and 134 or a new event 30 is detected, at 144, by the mobile device 10 and the mobile device 10 locally updates the status for the one or more applications, at 146, e.g., to revert to a status used prior to the previous event 30 detected, at 130. The status server 18 is also operable to detect the same end to the previous event 30 or the new event 30, at 148, and determines the associated status updates 32, at 150. It can be appreciated that, similar to the examples described above, the event-to-status mappings may be determined by referencing an event database 58 as shown in FIG. 7, by querying or requesting such information from an external database, or by referencing information included in the event message 30. The status server 18 may then send the status updates 32 to the appropriate systems 20, at 152, which are received by the respective systems 20, at 154. Each system 20 may then update its own status feature (e.g., presence, out-of-office, etc.), at 156. It can be appreciated that the system 20 may also send updates to other mobile devices 10 indicative of the status update 32 according to the nature of the service or status feature being utilized.

It can be appreciated that by enabling the status server 18 to detect events 30 as illustrated in FIG. 10, status updates 32 can be provided to the systems 20 by the status server 18 to offload processing burden from the mobile device 10, even when the mobile device 10 would be capable of updating the systems 20 or the status server 18 at that time.

Figure 11:
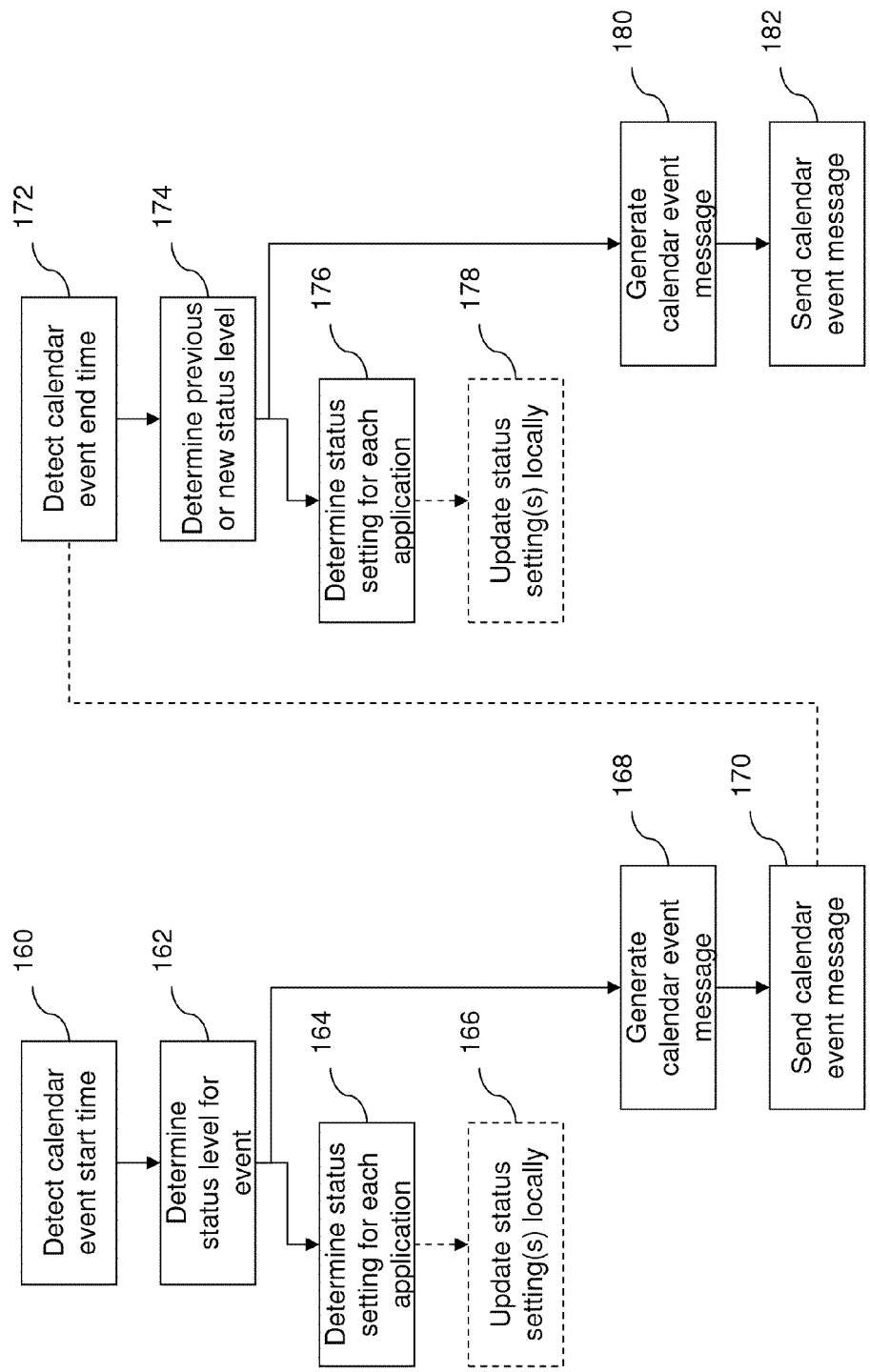
FIG. 11 illustrates example computer executable operations that may be performed in updating status information to a plurality of systems based on a calendar event.

FIG. 11 illustrates an example wherein the status updater 48 on the mobile device 10 or the status updater 60 on the status server 18 is operable to provide status updates 32 to at least one system 20 according to a calendar event 30. The calendar event start time is detected, at 160, and a status level for the calendar event is determined, at 162. The status level may be determined in various ways. For example, work-related events or meetings may have an "unavailable" status level whereas a social event may have a different status level.

The status level may be used, at 164, to determine a status setting for each application 46 meant to be updated. It can be appreciated that separate operations 162, 164 are shown for illustrative purposes only and the nature of the calendar event 30 detected, at 160, may have a direct correlation to multiple status settings, which may be determined directly therefrom. In examples wherein the status update module 48 on the mobile device 10 is being used, the mobile device 10 may locally update status settings for the applications 46, at 166, as shown in dashed lines in FIG. 11.

A calendar event message 30 is generated, at 168, and sent to the status server 18 or the systems 20, at 170. For example, the mobile device 10 may send the calendar event message 30 with event-to-status mappings to the status server 18. In another example, the status server 18 may send individual calendar event messages 30 to the respective systems 20, at 170. In yet another example, the mobile device 10 may be operable to send at least one of the calendar event messages 30 directly to a respective system 20. For example, the mobile device 10 may be operable to directly update a calendar server or system 20 (not shown) while having the status server 18 update one or more other systems 20.

FIG. 11 also illustrates detection of the end of the calendar event 30, at 172. A previous or new status level associated with the end of the calendar event 30 may be determined, at 174, and a status level for each application determined, at 176. In this way, the status update module 48, 60 may be operable to temporarily change a user's status for multiple systems 20 to coincide with the duration of a meeting or other event 30 associated with a calendar entry. In examples wherein the status update module 48 on the mobile device 10 is being used, the mobile device 10 may locally update status settings for the applications 46, at 178, as shown in dashed lines in FIG. 11. A calendar event message 30 is generated, at 180, and sent to the status server 18 or the systems 20, at 182, similar to what has been described above. It can be appreciated that the operations shown in FIG. 11 are applicable to various other event types, such as location, speed, time zone, etc.

Figure 12:
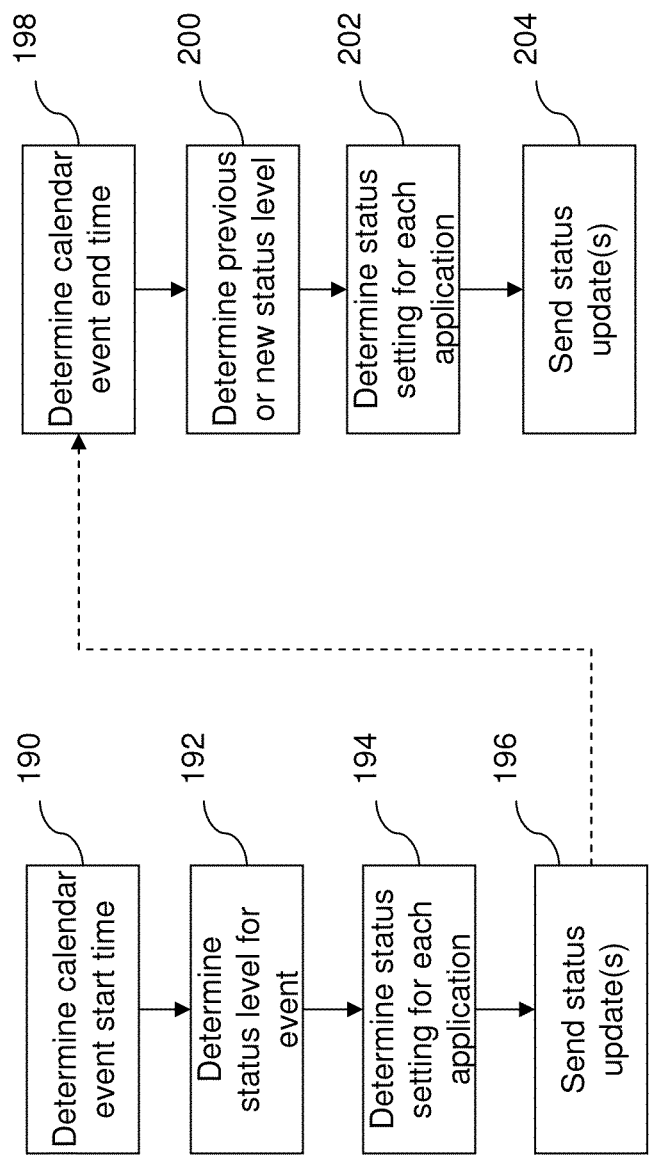
FIG. 12 illustrates example computer executable operations that may be performed in updating status information to a plurality of systems based on a calendar event.

FIG. 12 illustrates another example wherein status updates 32 are generated according to a calendar event's start time and end time. Similar to the example shown in FIG. 11, the operations shown in FIG. 12 may be performed by the status updater 48 on the mobile device 10 or the status updater 60 on the status server 18. The calendar event start time is detected, at 190, and a status level associated with the particular calendar event 30 is determined, at 192. An associated status setting for each application 46 is determined, at 194, according to the status level for that calendar event 30 and status updates 32 are sent, at 196, e.g., to the status server 18 or the systems 20. After the duration of the calendar event time elapses, an end time for the calendar event 30 may be detected, at 198. It can be appreciated that the end time for a calendar event 30 may change even during the event 30, e.g., wherein a meeting is extended and thus the status updater 48, 60 being used may also be operable to process changes to particular calendar events 30. It can also be appreciated that the status updater 48, 60 being used may also be operable to extend a calendar event end time based on other events 30. For example, the status updater 48, 60 may detect that the location of the mobile device 10 has not changed thus indicating a meeting that has gone "over time". By monitoring other events 30 in this way, the status updater 48, 60 may be capable of dynamically adjusting an event end time to more accurately adjust status settings.

After the event end time is detected, at 198, the previous status level or a new status level may be determined, at 200.

For example, subsequent to a meeting, the status level may be changed from "unavailable" to "busy" to accommodate for relative availability after the event 30 or otherwise provide a "buffer" or transition. The status setting to be applied to each application 46 may then be determined, at 202, and status updates 32 sent, at 204.

Figure 13:
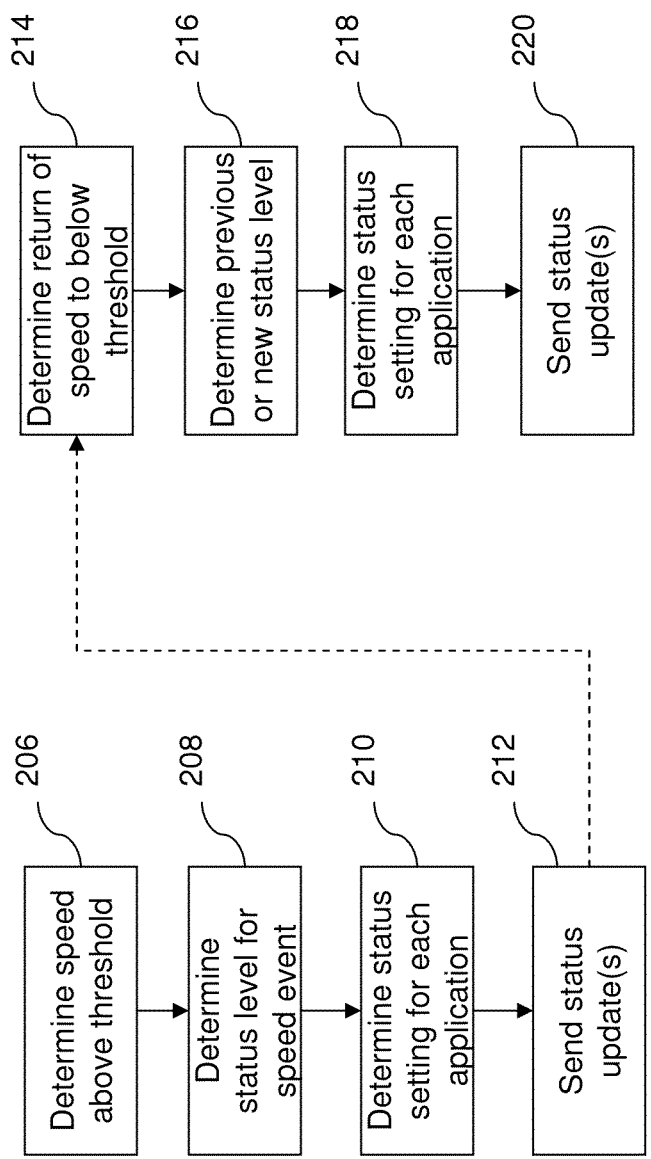
FIG. 13 illustrates example computer executable operations that may be performed in updating status information to a plurality of systems based on a speed event.

As discussed above, it can be appreciated that various detectable types of events 30 may trigger the provision of status updates 32. FIG. 13 illustrates an example wherein a speed associated with the mobile device 10 triggers an event 30 causing the provision of at least one status update 32, e.g., using a GPS receiver 321 (see also FIG. 16). In the example shown in FIG. 13, the status updater 48 determines, at 206, when a speed associated with the mobile device 10 reaches or exceeds a predetermined threshold. Such a threshold can be set according to a typically speed indicative of the user of the mobile device 10 being in transit. A status level associated with the particular speed event 30 is determined, at 208, and an associated status setting for each application 46 is determined, at 210, according to the status level for that speed event 30, e.g., by setting a presence status to "Driving". Status updates 32 may then be sent, at 212, e.g., to the status server 18 or the systems 20.

By monitoring the mobile device speed, the status updater 48 may detect, at 214, that the speed has returned to a level that is below the predetermined threshold for a predetermined amount of time, indicative of the user no longer being in transit, and thus the speed event 30 has ended. The predetermined amount of time can be set to accommodate, e.g., stoppages at traffic lights and the like. After the end of the speed event 30 has been detected, at 214, the previous status level or a new status level may be determined, at 216. The status setting to be applied to each application 46 may then be determined, at 218, and status updates 32 sent, at 220. It can be appreciated that the example shown in FIG. 13 may also be applicable to detecting an event indicative of the mobile device 10 being synchronized with an in-vehicle system (not shown) thus indicating that an associated user is in transit.

Figure 14:
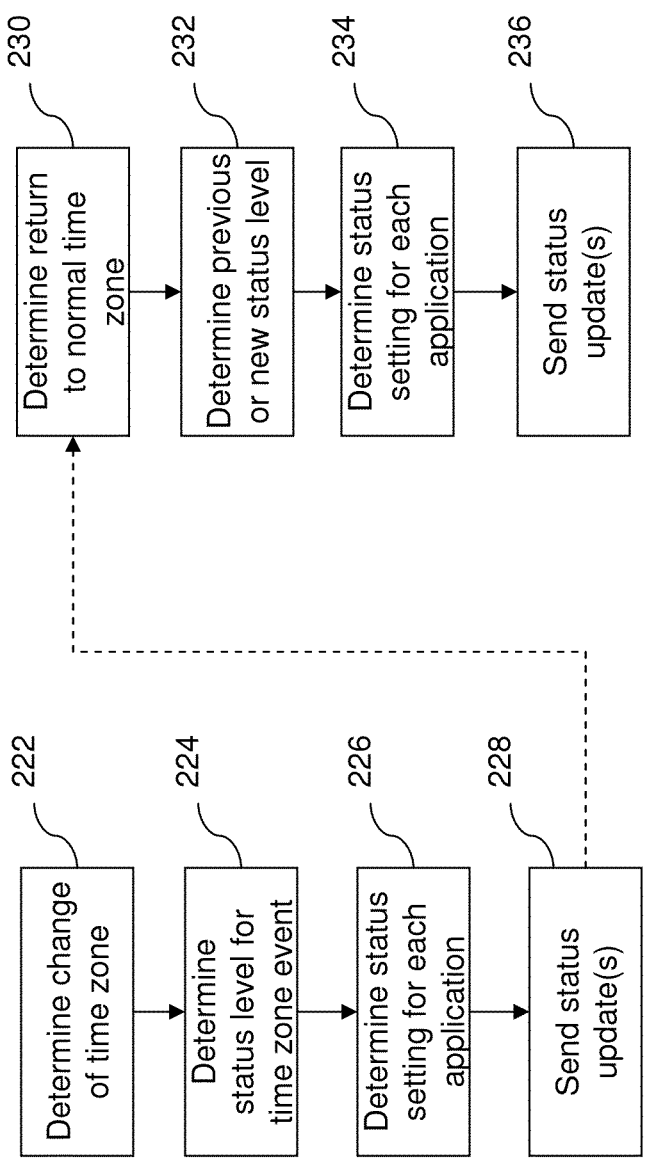
FIG. 14 illustrates example computer executable operations that may be performed in updating status information to a plurality of systems based on a time zone event.
Figure 16:
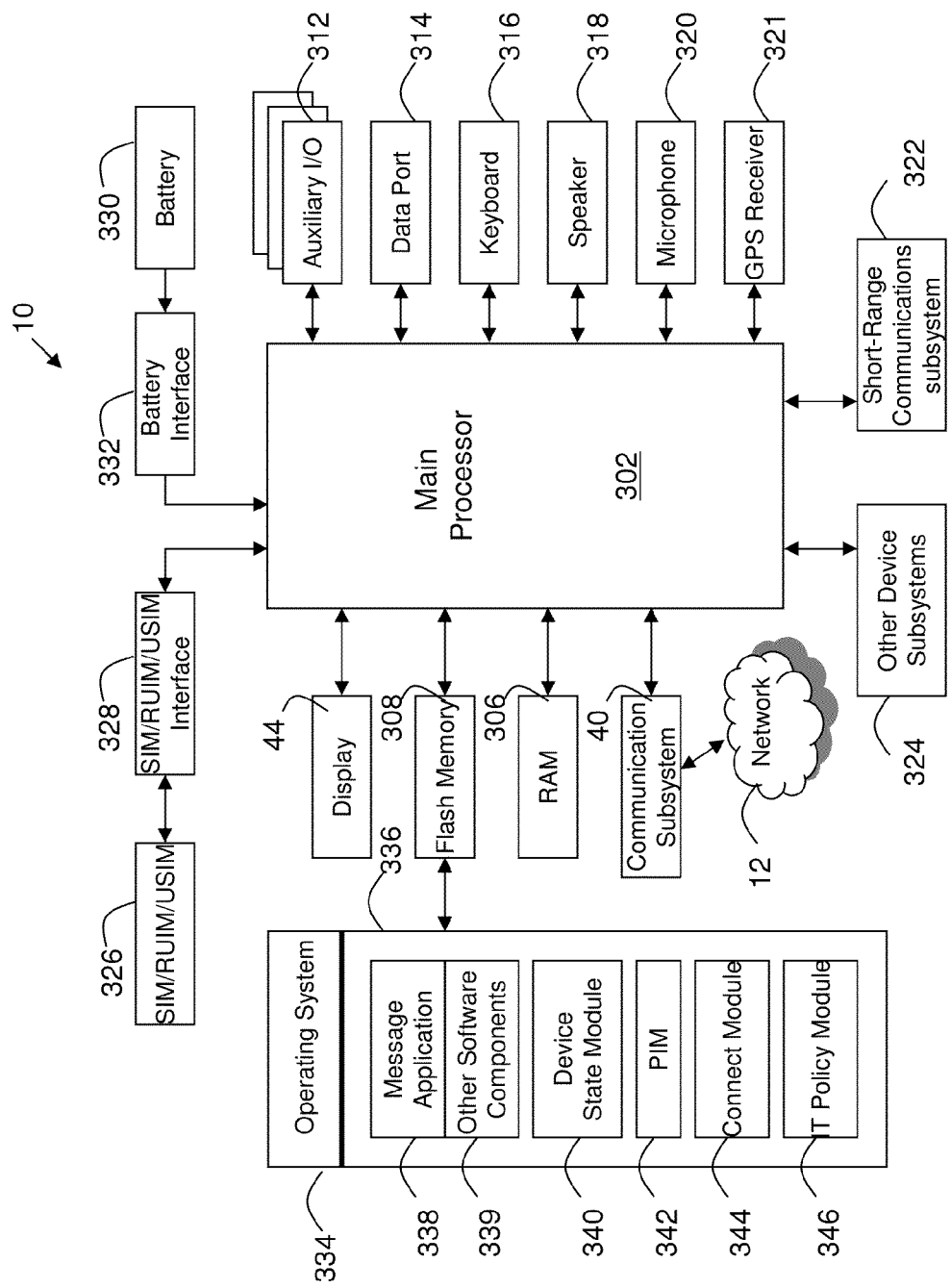
FIG. 16 is a block diagram of an example configuration for a mobile device.

FIG. 14 illustrates an example wherein a time zone associated with the mobile device 10 triggers an event 30 causing the provision of at least one status update 32, e.g., using a GPS receiver 321 (see also FIG. 16). In the example shown in FIG. 14, the status updater 48 determines, at 222, when a time zone associated with the mobile device 10 has changed. A change in time zone may affect the responsiveness or availability of the user and thus can be indicative of a need to provide a status update 32. A status level associated with the particular time zone event 30 is determined, at 224, and an associated status setting for each application 46 is determined, at 226, according to the status level for that time zone event 30, e.g., by setting a presence status to "unavailable" if the new time zone indicates the user's current time zone is outside of a particular range of hours in the day. Status updates 32 may then be sent, at 228, e.g., to the status server 18 or the systems 20.

By monitoring the mobile device's current time zone, the status updater 48 may detect at 230 that the mobile device 10 has returned to a normal time zone or other time zone that triggers a change back to the previous setting or triggers a new setting thus indicating an end to the time zone event 30 detected, at 222. For example, in addition to returning to a normal or "home" time zone, the user may continue travelling and return to a time zone that is different than their home time zone but which is still acceptable (e.g., one hour ahead or behind). After the end of the time zone event 30 has been detected, at 230, the previous status level or a new status level may be determined, at 232. The status setting to be applied to each application 46 may then be determined, at 234 and status updates 32 sent, at 236.

Figure 15:
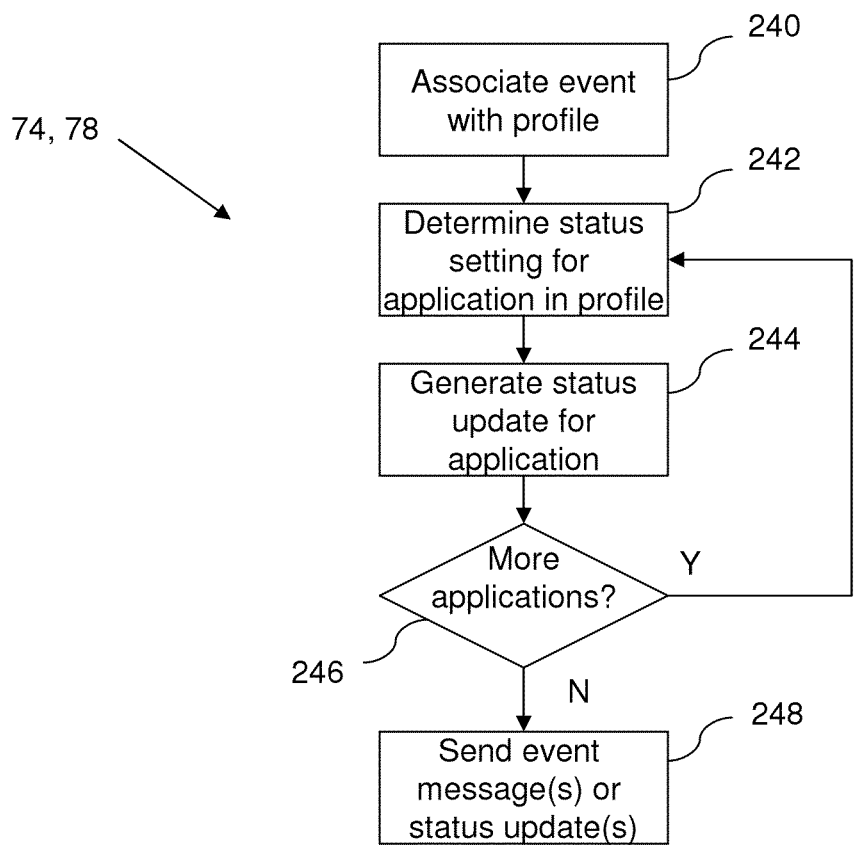
FIG. 15 illustrates example computer executable operations that may be performed in determining status updates.

FIG. 15 illustrates an example set of operations that may be performed by the status updater 48, 60 being used in updating or determining status updates 32 based on a detected event 30, e.g., during operations 74 and 78 shown in FIG. 8. In the example shown in FIG. 15, an event 30 is associated with a profile at 240, e.g., by referencing status profiles 50, 62 shown in FIGS. 6 and 7. Status settings for an application 46 being updated may then be determined from the profile 50, 62, at 242. The status updater 48, 60 then generates a status update 32 for that application 46 and/or its associated system 20, at 244. The status updater 48, 60 may then determine, at 246 if any additional applications 46 are to be updated. If so, operations 242 and 244 are repeated for each additional application 46 to be updated. Event messages 30 or status updates 32 may then be sent, at 248, to the status server 18 or systems 20 respectively.

Accordingly, there is provided a method of updating status information, the method comprising: determining a first event associated with a mobile device; determining, according to the first event, a first status change for the mobile device to be applied for each of a plurality of systems; and sending a first status update to each of the plurality of systems.

There is also provided an electronic device comprising a processor and a memory, the memory comprising computer executable instructions for causing the processor to update status information, the computer executable instructions comprising instructions for: determining a first event associated with a mobile device; determining, according to the first event, a first status change for the mobile device to be applied for each of a plurality of systems; and sending a first status update to each of the plurality of systems.

There is also provided a computer readable storage medium comprising computer executable instructions for updating status information, the computer executable instructions comprising instructions for: determining a first event associated with a mobile device; determining, according to the first event, a first status change for the mobile device to be applied for each of a plurality of systems; and sending a first status update to each of the plurality of systems.

Referring now to FIG. 16, shown therein is a block diagram of an example of a mobile device 10. The mobile device 10 includes a number of components such as a main processor 302 that controls the overall operation of the mobile device 10. Communication functions, including data and voice communications, are performed through a communication subsystem 40. The communication subsystem 40 receives messages from and sends messages to a wireless network 12. In this example of the mobile device 10, the communication subsystem 40 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 40 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 302 also interacts with additional subsystems such as a Random Access Memory (RAM) 306, a flash memory 308, a display 44, an auxiliary input/output (I/O) subsystem 312, a data port 314, a keyboard 316, a speaker 318, a microphone 320, GPS receiver 321, short-range communications subsystem 322 and other device subsystems 324.

Some of the subsystems of the mobile device 10 perform communication-related functions, whereas other subsystems may provide "resident" or on-device functions. By way of example, the display 310 and the keyboard 316 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more batteries 330 (typically rechargeable). In at least some examples, the battery 330 can be a smart battery with an embedded microprocessor. The battery interface 332 is coupled to a regulator (not shown), which assists the battery 330 in providing power V+ to the mobile device 10. Although current technology makes use of a battery, future technologies such as micro fuel cells may provide the power to the mobile device 10.

The mobile device 10 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Other software applications include a message application 338 that can be any suitable software program that allows a user of the mobile device 10 to send and receive electronic messages. Various alternatives exist for the message application 338 as is well known to those skilled in the art. Messages that have been sent or received by the user are typically stored in the flash memory 308 of the mobile device 10 or some other suitable storage element in the mobile device 10. In at least some examples, some of the sent and received messages may be stored remotely from the mobile device 10 such as in a data store of an associated host system that the mobile device 10 communicates with.

The software applications can further include a device state module 340, a Personal Information Manager (PIM) 342, and other suitable modules (not shown). The device state module 340 provides persistence, i.e. the device state module 340 ensures that important device data is stored in persistent memory, such as the flash memory 308, so that the data is not lost when the mobile device 10 is turned off or loses power.

The PIM 342 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 344, and an IT policy module 346. The connect module 344 implements the communication protocols that are required for the mobile device 10 to communicate with the wireless infrastructure and any host system, such as an enterprise system, that the mobile device 10 is authorized to interface with.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 12, the auxiliary I/O subsystem 312, the data port 314, the short-range communications subsystem 322, or any other suitable device subsystem 324. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 314 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 314 can be any suitable port that enables data communication between the mobile device 10 and another computing device. The data port 314 can be a serial or a parallel port. In some instances, the data port 314 can be a Universal Serial Bus (USB) port that includes data lines for data transfer and a supply line that can provide a charging current to charge the battery 330 of the mobile device 10.

The short-range communications subsystem 322 provides for communication between the mobile device 10 and different systems or devices, without the use of the wireless network 12. For example, the subsystem 322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 40 and input to the main processor 302. The main processor 302 may then process the received signal for output to the display 310 or alternatively to the auxiliary I/O subsystem 312. A subscriber may also compose data items, such as e-mail messages, for example, using the keyboard 316 in conjunction with the display 310 and possibly the auxiliary I/O subsystem 312. The auxiliary I/O subsystem 312 may include devices such as: a touch screen, mouse, track ball, track pad, optical navigation module, infrared fingerprint detector, or a roller wheel with dynamic button pressing capability. The keyboard 316 is an alphanumeric keyboard and/or telephone-type keypad. However, other types of keyboards may also be used, such as a virtual or "soft" keyboard rendered as images on a touch screen. A composed item may be transmitted over the wireless network 12 through the communication subsystem 40.

For voice communications, the overall operation of the mobile device 10 in this example is substantially similar, except that the received signals are output to the speaker 318, and signals for transmission are generated by the microphone 320. Alternative voice or audio I/O subsystems, such as a voice message recording subsystem, can also be implemented on the mobile device 10. Although voice or audio signal output is accomplished primarily through the speaker 318, the display 310 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the communication system 8, etc., or accessible or connectable thereto. Any application or module herein described may be implemented using computer readable/executable instructions that may be stored or otherwise held by such computer readable media.

Figure 17:
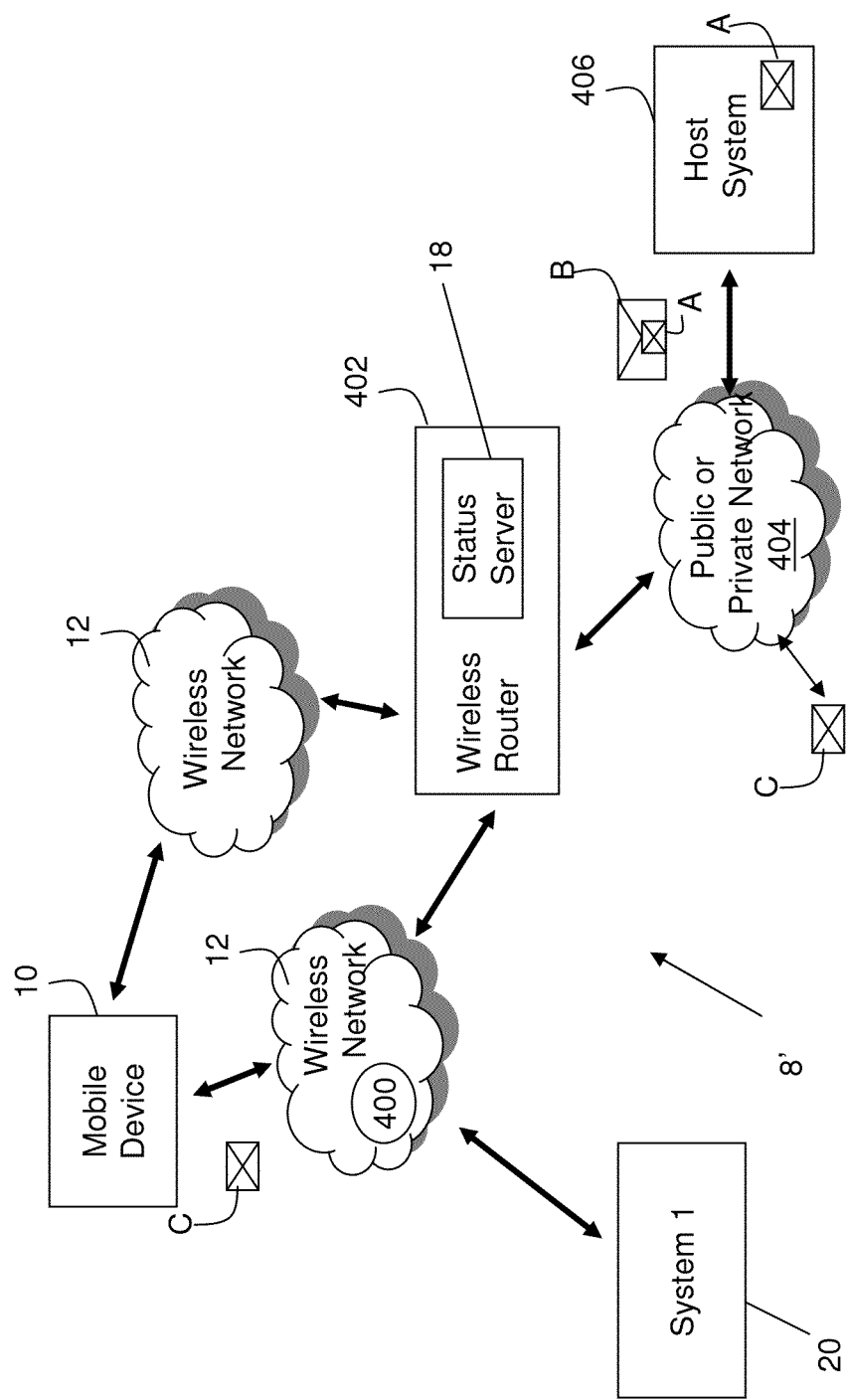
FIG. 17 is a block diagram of an example of a communication system comprising a wireless router and a host system.

As discussed above, the status server 18 or any component or module configured to operate according to the principles above, may be included with an entity or component of a network infrastructure 16. Turning now to FIG. 17, an example of a communication system 8' is shown in which a wireless router 402 is used to redirect data items from a corporate enterprise computer system (host system hereinafter) 406 to mobile devices 10 associated with the host system 406, via one or more wireless networks 12.

In the example shown in FIG. 17, user data items, such as message A or C, may be redirected from the host system 406 to the user's mobile device 10 via the wireless router 402. According to the examples described above, the data items shown in FIG. 17 may represent an event 30 or status update 32 provided to the status server 18 for providing to one or more systems 20, which may include the host system 406. The wireless router 402 provides the wireless connectivity functionality as it acts to both abstract most of the wireless network's complexities, and it also implements features necessary to support pushing data to the mobile device 10. Although not shown, a plurality of mobile devices 10 may access data from the host system 406. In this example, message A in FIG. 17 represents an internal message sent from, e.g. a desktop computer within the host system 406, to any number of server computers in the corporate network (e.g. LAN), which may, in general, include a database server, a calendar server, an E-mail server, an IM system, a voice-mail server, etc.

Message C in FIG. 17 represents an external message from a sender that is not directly connected to the host system 406, such as the user's mobile device 10, some other user's mobile device (not shown), or any user connected to a public or private network 404 (e.g. the Internet). Message C could be e-mail, voice-mail, calendar information, database updates, presence updates, web-page updates, or may represent a command message from the user's mobile device 10 to the host system 406. The host system 406 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like MICROSOFT EXCHANGE® Server or LOTUS NOTES® Server), typically behind a corporate firewall.

The mobile device 10 may be operable for communicating within wireless network 12 via wireless links, as required by each wireless network 12 being used. As an illustrative example of the operation for a wireless router 402 shown in FIG. 17, consider a data item A, repackaged in outer envelope B (the packaged data item A now referred to as "data item (A)") and sent to the mobile device 10 from an Application Service Provider (ASP) in the host system 406. Within the ASP is a computer program, similar to a wireless mobility agent, running on any computer in the ASP's environment that is sending requested data items from a data store to a mobile device 10. The mobile-destined data item (A) is routed through the network 404, and through the wireless router's firewall protecting the wireless router 402.

Although the above describes the host system 406 as being used within a corporate enterprise network environment, this is just one embodiment of one type of host service that offers push-based messages for a handheld wireless device that is capable of notifying and preferably presenting the data to the user in real-time at the mobile device 10 when data arrives at the host system 406.

By providing a wireless router 402 (sometimes referred to as a "relay"), there are a number of major advantages to both the host system 406 and the wireless network 12. The host system 406 in general runs a host service that is considered to be any computer program that is running on one or more computer systems. The host service is said to be running on a host system 406, and one host system 406 can support any number of host services. A host service may or may not be aware of the fact that information is being channeled to mobile devices 10. For example an e-mail or message program 338 (see FIG. 16) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 402, like customer relationship management software. In a third example, there might be a common access to a range of host services. For example a mobility agent might offer a Wireless Access Protocol (WAP) connection to several databases.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of updating status information, the method comprising:
   detecting, at a status server within a network, that a mobile device is one of offline with respect to the network and out of coverage from the network and is unable to communicate with the status server and a plurality of information processing systems within the network;
   receiving, at the status server while the mobile device is one of offline and out of coverage, one or more events associated with the mobile device from at least one information processing system in the plurality of information processing systems;
   determining, at the status server based on detecting that the mobile device is one of offline and out of coverage and the one or more events that have been received, a first status change for the mobile device to be applied for one or more information processing systems in the plurality of information processing systems, each of the one or more information processing systems being associated with a corresponding communication service for a plurality of entities comprising the mobile device; and
   sending, by the status server, a first status update from the status server to each of the one or more information processing systems on behalf of the mobile device while the mobile device is one of offline and out of coverage.

2. The method of claim 1, further comprising:
   determining a second status change for the mobile device to be applied for one or more information processing systems in the plurality of information processing systems; and
   sending a second status update to each of the one or more information processing systems.

3. The method of claim 2, wherein the second status change results in a same status as prior to the first status change.

4. The method of claim 2, wherein the second status change is associated with a start time for a calendar appointment.

5. The method of claim 2, wherein the second status change is associated with detecting that a speed associated with the mobile device exceeds a predetermined threshold.

6. The method of claim 2, wherein the second status change is associated with detecting that a time zone associated with the mobile device has changed.

7. The method of claim 1, further comprising receiving, from the mobile device after the mobile device becomes one of online and within network coverage, a first message comprising an indication of an event.

8. The method of claim 1, wherein the network is a wireless infrastructure used by the mobile device for communicating via at least one of the one or more information processing systems.

9. The method of claim 1, further comprising the status server storing event information for detecting that the mobile device is one of offline and out of coverage.

10. The method of claim 1, further comprising receiving a first message comprising an indication that the mobile device is one of offline and out of network coverage from an external source.

11. The method of claim 10 further comprising sending a second message comprising an indication of the first message to the mobile device.

12. The method of claim 1, wherein the first status change is associated with a status level associated with an event detected by the status server associated with the mobile device.

13. A non-transitory computer readable storage medium comprising computer executable instructions for updating status information, the computer executable instructions comprising instructions for:
   detecting, at a status server within a network, that a mobile device is one of offline with respect to the network and out of coverage from the network and is unable to communicate the status server and a plurality of information processing systems within the network;
   receiving, at the status server while the mobile device is one of offline and out of coverage, one or more events associated with the mobile device from at least one information processing system in the plurality of information processing systems;
   determining at the status server, based on detecting that the mobile device is one of offline and out of coverage and the one or more events that have been received, a first status change for the mobile device to be applied for one or more information processing systems in the plurality of information processing systems, each of the one or more information processing systems being associated with a corresponding communication service for a plurality of entities comprising the mobile device; and
   sending a first status update from the status server to each of the one or more information processing systems on behalf of the mobile device while the mobile device is one of offline and out of coverage.

14. The non-transitory computer readable storage medium of claim 13, further comprising instructions for:
   determining a second status change for the mobile device to be applied for one or more information processing systems in the plurality of information processing systems; and
   sending a second status update to each of the one or more information processing systems.

15. The non-transitory computer readable storage medium of claim 14, wherein the second status change results in a same status as prior to the first status change.

16. The non-transitory computer readable storage medium of claim 14, wherein the second status change is associated with a start time for a calendar appointment.

17. The non-transitory computer readable storage medium of claim 14, wherein the second status change is associated with detecting that a speed associated with the mobile device exceeds a predetermined threshold.

18. The non-transitory computer readable storage medium of claim 14, wherein the second status change is associated with detecting that a time zone associated with the mobile device has changed.

19. The non-transitory computer readable storage medium of claim 13, further comprising instructions for receiving, from the mobile device after the mobile device becomes one of online and within network coverage, a first message comprising an indication of an event.

20. The non-transitory computer readable storage medium of claim 13, wherein the network is a wireless infrastructure used by the mobile device for communicating via at least one of the one or more information processing systems.

21. The non-transitory computer readable storage medium of claim 13, further comprising instructions for the status server storing event information for detecting that the mobile device is one of offline and out of coverage.

22. The non-transitory computer readable storage medium of claim 13, further comprising instructions for receiving a first message comprising an indication that the mobile device is one of offline and out of network coverage from an external source.

23. The non-transitory computer readable storage medium of claim 22, further comprising instructions for comprising sending a second message comprising an indication of the first message to the mobile device.

24. The non-transitory computer readable storage medium of claim 13, wherein the first status change is associated with a status level associated with a first event.

25. A status server comprising a processor and a memory, the memory comprising computer executable instructions for causing the processor to update status information, the computer executable instructions comprising instructions for:
  detecting, at the status server within a network, that a mobile device is one of offline with respect to the network and out of coverage from the network and is unable to communicate with the status server and a plurality of information processing systems within the network;
  receiving, at the status server while the mobile device is one of offline and out of coverage, one or more events associated with the mobile device from at least one information processing system in the plurality of information processing systems;
  determining, at the status server based on detecting that the mobile device is one of offline and out of coverage and the one or more events that have been received, a first status change for the mobile device to be applied for communication one or more information processing systems in the plurality of information processing systems, each of the one or more information processing systems being associated with a corresponding communication service for a plurality of entities comprising the mobile device; and
  sending, by the status server, a first status update from the status server to each of the one or more information processing systems on behalf of the mobile device while the mobile device is one of offline and out of coverage.

* * * * *